United States Patent
Seo et al.

(10) Patent No.: US 6,912,865 B2
(45) Date of Patent: Jul. 5, 2005

(54) ELASTIC MEMBER AND VIBRATION ABSORPTION APPARATUS FOR A REFRIGERATOR COMPRESSOR

(75) Inventors: Sang Ho Seo, Gwangmyeong-si (KR); Dong Hoon Lee, Incheon-si (KR); Young Hoon Yun, Daegu-si (KR); Moo Youl Kim, Seoul (KR); Hyoung Keun Lim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/671,449

(22) Filed: Sep. 29, 2003

(65) Prior Publication Data

US 2004/0168464 A1 Sep. 2, 2004

(30) Foreign Application Priority Data

Feb. 28, 2003 (KR) ................................ 10-2003-0012712

(51) Int. Cl.⁷ ............................................. F25D 23/10
(52) U.S. Cl. ........................... 62/295; 62/296; 181/207; 248/638; 417/363
(58) Field of Search .................. 62/295, 296; 181/205, 181/206, 207; 248/615, 638; 417/363

(56) References Cited

U.S. PATENT DOCUMENTS

| | | | | |
|---|---|---|---|---|
| 2,631,330 A | * | 3/1953 | Becker ........................... | 16/30 |
| 2,685,178 A | * | 8/1954 | Eck ............................... | 62/295 |
| 3,785,167 A | * | 1/1974 | Sahs ............................. | 62/296 |
| 4,066,058 A | * | 1/1978 | Anderkay ................... | 123/198 E |
| 4,891,955 A | * | 1/1990 | Klausing et al. ............... | 62/295 |
| 4,953,658 A | * | 9/1990 | Goto ........................... | 181/207 |
| 5,201,489 A | * | 4/1993 | Wolf et al. ................... | 248/638 |
| 5,839,295 A | * | 11/1998 | Lehmann ..................... | 62/498 |
| 6,029,942 A | * | 2/2000 | Daddis et al. ............... | 248/635 |
| 6,254,068 B1 | * | 7/2001 | Chen et al. .................. | 267/136 |
| 6,543,741 B1 | * | 4/2003 | Li et al. ...................... | 248/638 |
| 6,648,295 B2 | * | 11/2003 | Herren et al. ............... | 248/636 |
| 2004/0096341 A1 | * | 5/2004 | Hung .......................... | 417/363 |

* cited by examiner

Primary Examiner—William E. Tapolcai
(74) Attorney, Agent, or Firm—Greenblum & Bernstein, P.L.C.

(57) ABSTRACT

The present invention relates to an elastic member and apparatus for a refrigerator compressor. A vibration absorption apparatus for a refrigerator compressor according to the present invention is connected to a foot of the compressor for transmitting the vibration generated when the compressor is operated, and includes an elastic member having a hollow passing through the central portion in an axial direction is formed; a base pan installed on a bottom of the refrigerator machinery room, for supporting the elastic member; a stand coupled with the base pan and passing through the hollow of the elastic member; and a stopper installed on the stand, for preventing the elastic member from being escaped from the base pan. The elastic member comprises a body having a plurality grooves enclosing an inner surface and outer surface thereof to have a vertical section in a zigzag; a projection of an upper portion of the body to which the stopper is forcedly attached; and a base being a lower portion of the body.

11 Claims, 6 Drawing Sheets

ELASTIC MEMBER AND VIBRATION ABSORPTION APPARATUS FOR A REFRIGERATOR COMPRESSOR

This application claims the benefit of the Korean Application No. P2003-0012712 filed on Feb. 28, 2003, which is hereby incorporated by reference.

BACKGROUND OF THE INVENTION

1. Field of the Invention

The present invention relates to an elastic member and vibration absorption apparatus for a refrigerator compressor, and more particularly, to an elastic member and vibration absorption apparatus having an improved performance, which is suitable for a compressor of a refrigerator which is capable of preventing the vibration generated due to the compressor from being transmitted to other elements or a whole of the refrigerator.

2. Discussion of the Related Art

Generally, a refrigerator is an apparatus for maintaining foods for a long time period in a fresh and good state. The inside of the refrigerator is always kept below a predetermined temperature by the compressor of the refrigerator.

The compressor is an apparatus for compressing refrigerant to be in a high temperature/high pressure. While the compressor operates, the vibration continues to be generated from the compressor. The generated vibration is transmitted to other elements of the refrigerator connected to the compressor without damping, so that a noisy vibration is generated from the whole of the refrigerator.

In order to prevent this phenomenon, an elastic member is installed between the compressor of the refrigerator and a base pan for supporting the compressor to attenuate a transmittance of the vibration.

Referring to FIG. 1, a compressor C is installed in the refrigerator machinery room and the compressor is mounted on the vibration absorption apparatus with a foot of the compressor.

The vibration absorption apparatus includes an elastic member on which the compressor is mounted, a base pan, a stand and a stopper.

The elastic member is provided with a hollow passing through in an axis and attenuates the vibration generated when the compressor is operated.

The base pan is installed on a bottom of the refrigerator machinery room to support the elastic member.

The stand extends from the base pan and is installed passing through the hollow of the elastic member so that the elastic member is not bent nor escaped.

The stopper is installed on the upper portion of the stand so as to compress the upper portion of the elastic member and prevents the elastic member from being escaped from the base pan.

Referring to the structure described above, the vibration generated from the compressor is transmitted to the elastic member and the transmitted vibration is attenuated by the elastic member and transmitted to the base and the stand. The transmitted vibration is transmitted to the whole refrigerator.

On the other hand, the upper portion of the elastic member is coupled compressed and weighted so as to be forcedly attached to the stopper. Otherwise, the stopper and the elastic member is spaced from each other due to the compression of the elastic member caused by the compressor weight caused when the compressor is mounted on the elastic member and the compression caused when vibration is caused according to the operation of the compressor. So, the stopper is vibrated.

However, the compression weight compresses and deforms the elastic member so that the vibration absorption performance of the elastic member is deteriorated.

SUMMARY OF THE INVENTION

Accordingly, the present invention is directed to an elastic member and vibration absorption apparatus for a refrigerator compressor that substantially obviates one or more problems due to limitations and disadvantages of the related art.

An object of the present invention is to provide an elastic member and vibration absorption apparatus for a refrigerator compressor that improve the shape of a stopper attaching portion and minimize the compression force caused when the elastic elastic member is forcedly attached to and coupled with the stopper so that the vibration absorption performance is improved by initial deformation caused to the body.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a vibration absorption apparatus for a refrigerator compressor according to the present invention is connected to a foot of the compressor for transmitting the vibration generated when the compressor is operated as shown in FIG. 2, and includes an elastic member of a driving device on which a hollow passing through the central portion in an axial direction is formed; a base pan installed on a bottom of the refrigerator machinery room, for supporting the elastic member; a stand coupled with the base pan and passing through the hollow of the elastic member; and a stopper installed on the stand, for preventing the elastic member from being escaped.

The elastic member comprises a body on which a plurality grooves enclosing an inner surface and outer surface are shaped to have a vertical section in a zigzag; a projection of an upper portion of the body to which the stopper is forcedly attached; and a base being a lower portion of the body.

The above-mentioned shape of the elastic member acts like a bellows on a vertical load caused when the compressor is vibrated so that the vibration is attenuated.

The projection to which the stopper is attached has horizontal sectional area that is less than the horizontal sectional area of the body, and is formed on the body. The stopper is installed and forcedly attached to the projection with a predetermined load.

When the foot of the compressor are connected to the elastic member, the elastic member shrinks due to the weight of the compressor, and attenuates and delivers the vibration caused when the compressor is operated. Therefore, unless the elastic member and the stopper are forcedly attached to each other with a predetermined load, the gap between the elastic member and the stopper is generated when the compressor is operated and the stopper is vibrated. To prevent this, the stopper and the elastic member are cealingly attached to each other with a predetermined load.

Here, the projection to which the stopper is cealingly attached should be forcedly attached to the stopper with a predetermined compression force to prevent the elastic member and the stopper from being escaped and vibrated respectively. The body of the elastic member should be made to support the minimum compression load. For this, the horizontal sectional area of the cealingly attaching portion is made to be less than the horizontal sectional area of the body so that the cealingly attaching portion is projecting on the body. More preferably, the projection has prominence and depression.

According to the present invention described above, the load required to forcedly attach the elastic member to the stopper is reduced and the load transmitted to the body of the elastic member. Accordingly, the initial deformation of the elastic member is minimized so that the vibration absorption is improved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The additional description of them is omitted.

To help understand the present invention, a compressor for a refrigerator will be described. The compressor compresses coolant of low temperature and low pressure to high temperature and high pressure and projects the coolant. The coolant projected from the compressor discharges heat to air, is expanded and changed to low temperature and low pressure by an expansion apparatus, and absorbs heat inside the refrigerator.

The refrigerator keeps low temperature inside the refrigerator and maintains the freshness of food.

However, vibration is generated when a compressor is operated. The generated vibration is transmitted to the whole refrigerator through the components connected to the compressor so that the vibration and noise sound from the refrigerator.

Figure 1:
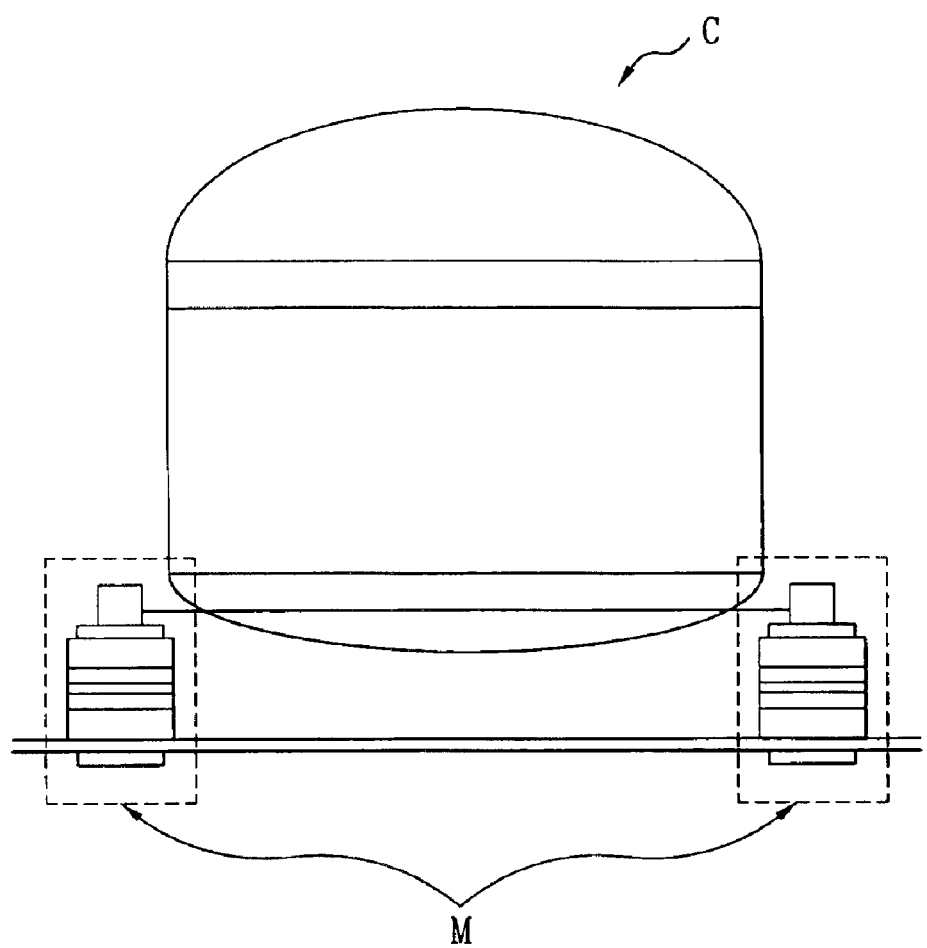
FIG. 1 is a schematic view illustrating that an compressor is installed in a refrigerator machinery room.
Figure 2:
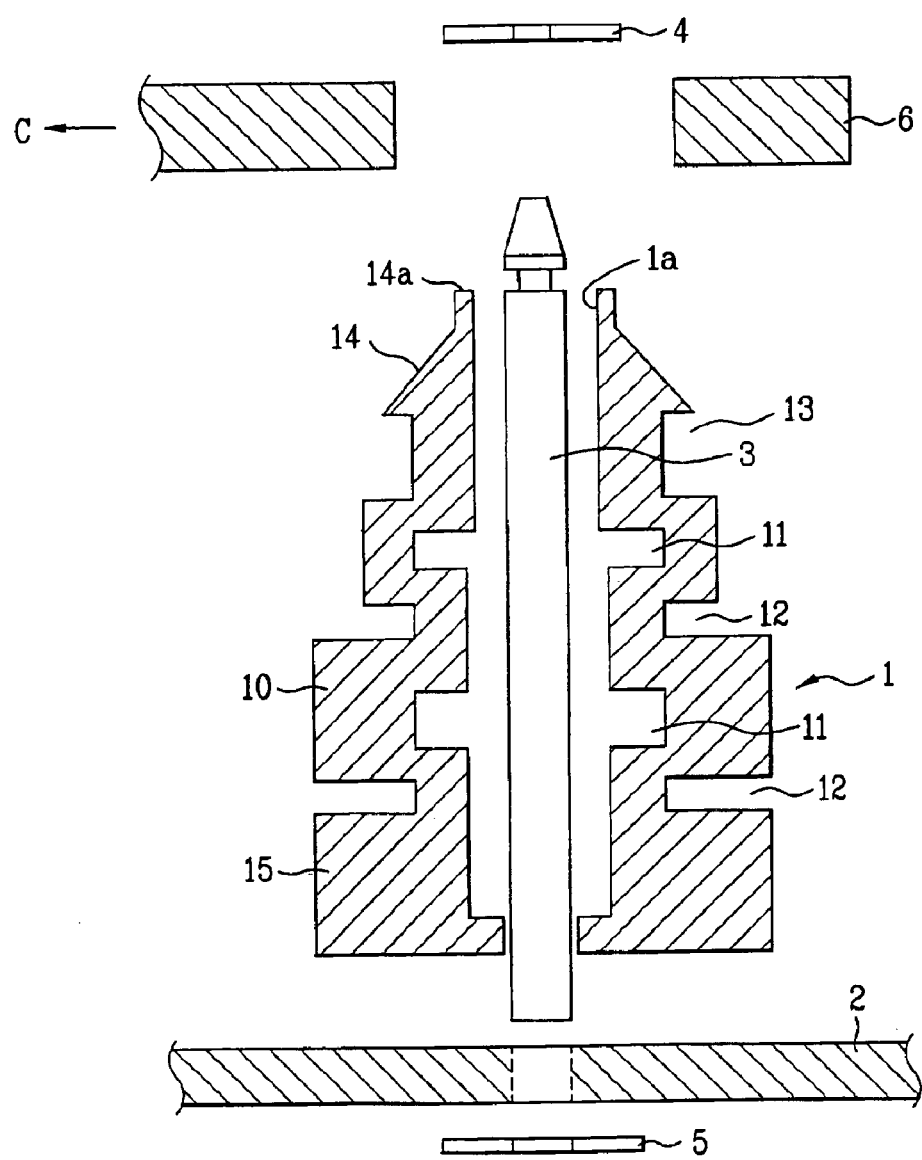
FIG. 2 is a sectional view illustrating a vibration absorption apparatus according to the present invention separately.

To reduce the vibration and noise, the compressor C and the vibration absorption apparatus M which the compressor C is mounted on are illustrated in FIG. 1 schematically. FIG. 2 is a sectional view illustrating a vibration absorption apparatus according to the present invention separately.

Referring to FIG. 2, the vibration absorption apparatus includes an elastic member 1 for absorbing vibration of a compressor, a base pan 2 for supporting the elastic member, a stand 3 installed on the base pan 2 by a coupler and passing through a hollow of the elastic member 1, and a stopper 4 installed on the stand 3 and for preventing the elastic member from being escaped.

Here, the elastic member 1 for absorbing the vibration of the compressor includes a body 10 having a base 15 which is a lower portion of the body and a stopper coupling part 14 provided on a top of the body 10. The body 10 and the stopper coupling part 14 are integrally formed as one body.

A hollow is formed in the elastic member 1, which hollow axially passes through a central portion of the body 10, the base 15, and the stopper coupling part 14.

The body 10 is shaped to have a vertical section in a zigzag configuration. For this, a plurality of interior and exterior grooves 11 and 12 enclosing an interior surface and an exterior surface of the body 10 are formed so that the vibration-absorbing performance of the elastic member 1 is improved.

More particularly, each of the interior grooves 11 is formed in a circumferential direction of the interior surface of the body 10, and each of the exterior grooves 12 is formed in a circumferential direction of the exterior surface of the body 10.

In addition, an engaging groove 13 is formed on the upper portion of the body 10 so that a compressor foot 6 can be mounted on the engaging groove 13 and secured.

The stopper coupling part 14 is formed in a conical form, so that a diameter of the stopper coupling part 14 is reduced, or grows smaller, from a lower portion to an upper portion thereof.

The stopper coupling part 14 includes a projection 14a formed in the top thereof which is pressed by the stopper 4.

The horizontal section of the elastic member 1 is shaped to have a vertical section and to have a rounded section or a rectangular horizontal section. The shape of the elastic member acts as a bellows on vertical load caused when the compression is vibrated so that the vibration is attenuated.

The projection 14a to which the stopper is sealingly attached has a predetermined thickness so that a horizontal sectional area is less than the horizontal sectional area of the body 10.

When the foot of the compressor is connected to the elastic member 1, the elastic member 1 shrinks due to weight of the compressor and attenuates and transmits the vibration generated when the compressor is operated. Therefore, unless the elastic member 1 is forcedly attached to the stopper 4 with a predetermined load, a gap between the elastic member 1 and the stopper 4 is generated and the stopper 4 is vibrated when the compressor is operated. To prevent this, the stopper 4 is cealingly attached to the elastic member 1 with a predetermined load.

The projection 14a of the elastic member 1 should be forcedly attached to the stopper with a predetermined compression force to prevent the elastic member 1 and the stopper 4 from being escaped and vibrated respectively. The body 10 should be weighted by the minimum compression load. For this, the horizontal sectional area of the projection 14a is formed to be less than the horizontal sectional area of the body 10 so that the projection 14a is projecting on the upper portion of the body.

Meanwhile, the base pan 2 is installed on the bottom of the refrigerator machinery room and supports the lower portion of the elastic member 1.

The stand 3 is coupled with the base pan 2 and inserted into the hollow of the elastic member. The small gap is formed between the inner surface 1a of the hollow of the elastic member and the stand 3. The gap is formed to transmit the vibration of the elastic member to the stand 3 as little as possible when the compressor C is operated.

Figure 3:
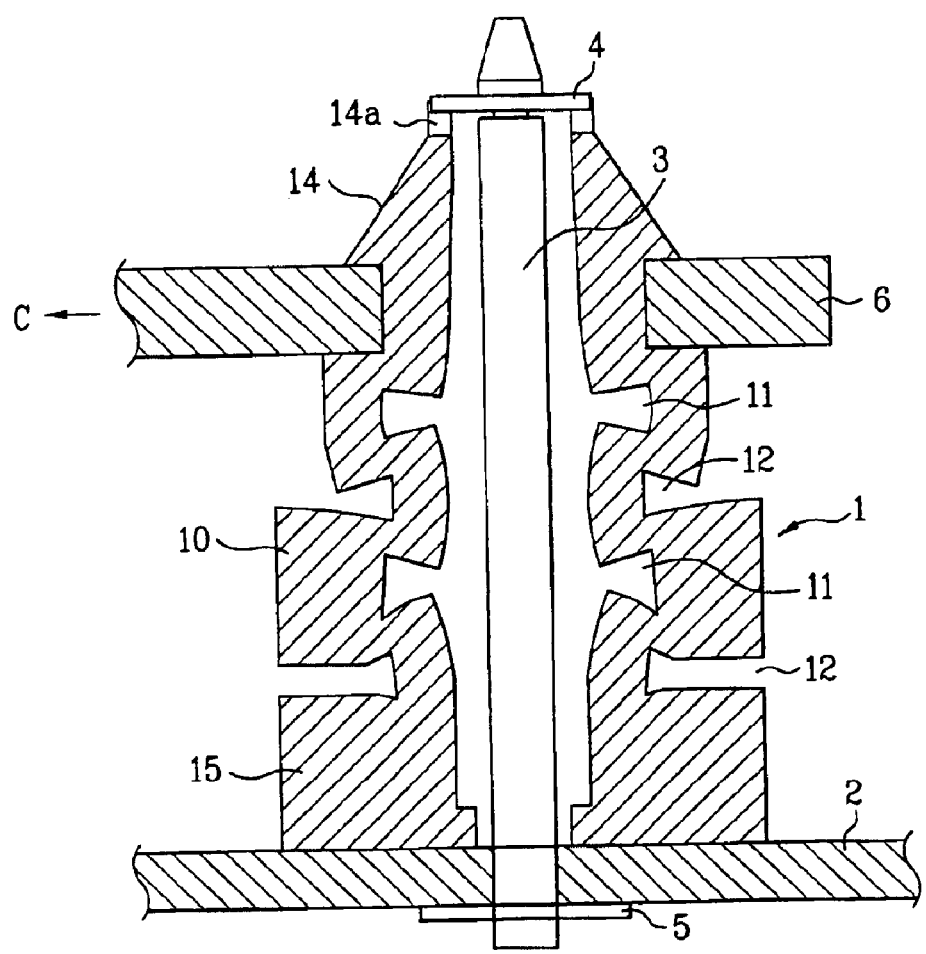
FIG. 3 is a sectional view illustrating that a compressor is mounted on the vibration absorption apparatus according to the present invention.

FIG. 3 is a sectional view illustrating that a compressor is mounted on the vibration absorption apparatus according to the present invention. When a compressor is mounted on the vibration absorption apparatus as shown in FIG. 3, the elastic member is deformed initially a little bit due to the compression force applied from the stopper.

In the vibration absorption apparatus for a refrigerator compressor configured as above, the process to transmit the vibration generated from the compressor will be described as follows.

The vibration generated when the compressor C is operated is transmitted to the elastic member 1 by the foot 6 of the compressor connecting the compressor to the elastic member 1.

The elastic member 1 absorbs the vibration of the compressor as much as a considerable amount and transmits the absorbed vibration to the base pan 2 and the stand 3.

Finally, the vibration transmitted to the base pan 2 and the stand 3 is transmitted to the whole refrigerator.

Hereafter, a preferable embodiment of the elastic member and the vibration absorption apparatus for a refrigerator compressor will be described referring to FIGS. 4, 5 and 6. The basic configuration and connections will be omitted since they are the same as described above.

Figure 4:
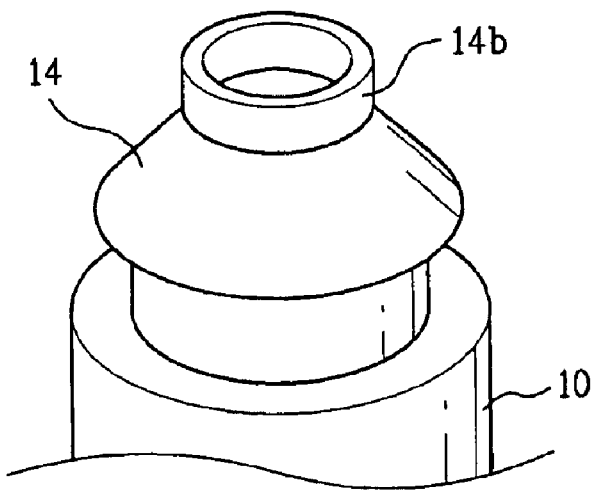
FIG. 4 is a perspective view illustrating an upper portion of the vibration absorption apparatus whose projection has a rounded section.

Referring to FIG. 4, the elastic member has a projection 14b having a horizontal section in form of ring shape. The material of the elastic member is preferably rubber. Here, since the horizontal sectional area of the projection 14b is much less than that of the body 10, the compression stress for a predetermined load and the compression deformation is more.

Therefore, the compression force required making the minimum compression deformation to prevent a gap between the elastic member 1 and the stopper 4 from generated is less than that of the related art. Accordingly, since the load weighted on the body 10 of the elastic member is less that of the related art, the initial deformation of the body becomes less.

Figure 5A:
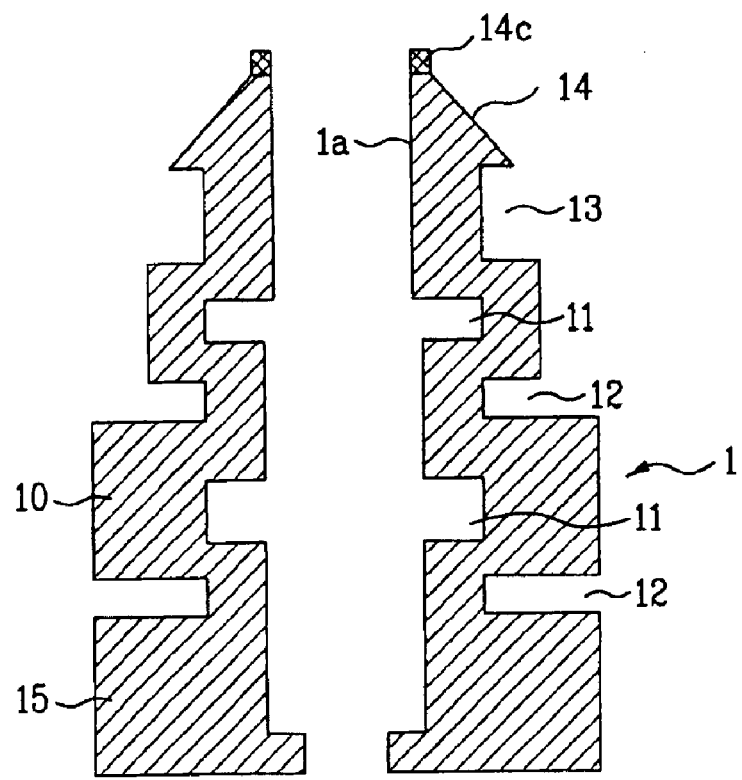
FIG. 5A is a sectional view illustrating an elastic member whose projection has prominence and depression.
Figure 5B:
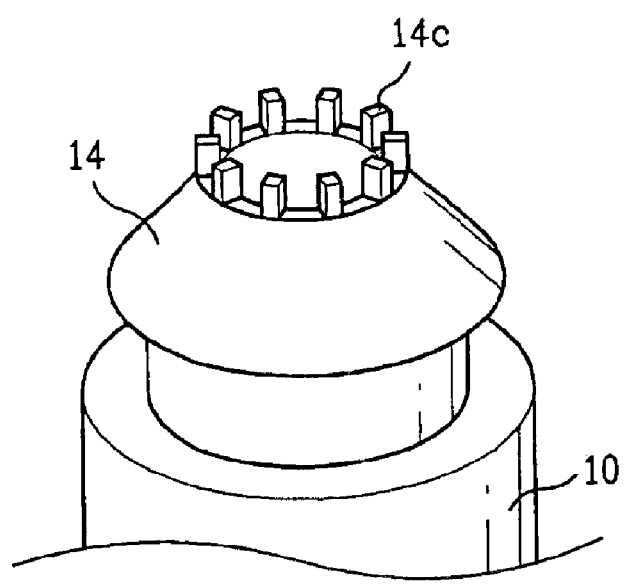
FIG. 5B is a perspective view illustrating an upper portion of an elastic member whose projection has prominence and depression.
Figure 6:
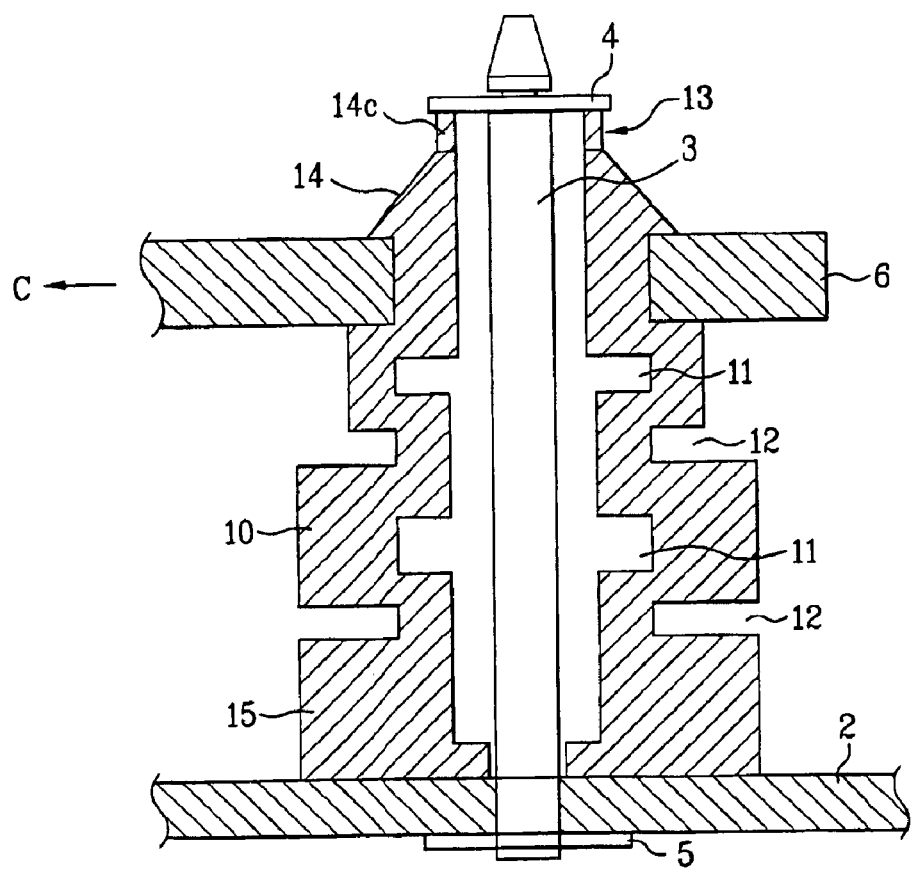
FIG. 6 is a sectional view illustrating that a compressor is installed in a vibration absorption apparatus for a refrigerator compressor using an elastic member whose projection has prominence and depression.

As shown in FIGS. 5A and 5B, the top of the stopper coupling part 14 comprises a plurality of projections 14c. More preferable, the distance between a neighboring projections is uniform.

Depression portions between the projections 14c reduce the horizontal sectional area more so that the initial compression force on the body is reduced more.

The effects of the present invention configured as described above are as follows.

According to the present invention, since the compression force required avoiding the escape of the elastic member and the vibration of the stopper is reduced, the initial deformation of the body of the elastic member can be minimized so that vibration absorption performance is improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A vibration absorption apparatus for a refrigerator compressor, the vibration absorption apparatus comprising:
   an elastic member comprising:
      a body on which a compressor is mounted, the body having a base which is a lower portion of the body and a plurality of grooves enclosing an inner surface and outer surface thereof to have a vertical section in a zigzag,
      a stopper coupling part in a conical form provided on a top of the body and having an upper projection whose horizontal sectional area is less than the horizontal sectional area of the body, wherein the stopper coupling part and the body are integrally formed, and a diameter of the stopper coupling part grows smaller from a lower portion to an upper portion thereof, and
      a hollow axially passes through a central portion of the body and the stopper coupling part;
   a base pan for supporting the base of the elastic member;
   a stand passing through the hollow of the elastic member; and
   a stopper installed on the stand so as to be forcedly attached to the upper projection of the elastic member stopper coupling part by a predetermined force, for preventing the elastic member from being separated therefrom.

2. The vibration absorption apparatus of claim 1, wherein the upper projection is shaped to have a rounded section.

3. The vibration absorption apparatus of claim 2, wherein the upper projection has prominence and depression.

4. The vibration absorption apparatus of claim 3, wherein the prominence and the depression have uniform distance to a neighboring prominence and a neighboring depression respectively.

5. The vibration absorption apparatus of claim 1, wherein the elastic member is made of rubber.

6. The vibration absorption apparatus of claim 4, wherein the elastic member is made of rubber.

7. A refrigerator comprising:
   an outer case;
   a cooling system comprising: a compressor, an inner heat exchanger, a refrigerant expansion unit and an outer heat exchanger; and
   a vibration absorption apparatus for a refrigerator compressor comprising:
      an elastic member comprising:
         a body on which a compressor is mounted, the body having a base which is a lower portion of the body and a plurality of grooves enclosing an inner surface and outer surface thereof to have a vertical section in a zigzag, a stopper coupling part in a conical form provided on a top of the body and having an upper projection whose horizontal sectional area is less than the horizontal sectional area of the body, wherein the stopper coupling part and the body are integrally formed, and a diameter of the stopper coupling part grows smaller from a lower portion to an upper portion thereof, and a hollow axially passes through a central portion of the body and the stopper coupling part, a base pan for supporting the base of the elastic member;

a stand coupled with the base pan and passing through the hollow of the elastic member, and a stopper installed on an upper portion of the stand, for preventing the elastic member from being separated therefrom.

8. The refrigerator of claim 7, wherein the upper projection is shaped to have a rounded section.

9. The refrigerator of claim 8, wherein the upper projection has prominence and depression.

10. The refrigerator of claim 9, wherein the prominence and the depression have uniform distance to a neighboring prominence and a neighboring depression respectively.

11. The refrigerator of claim 10, wherein the elastic member is made of rubber.

* * * * *